United States Patent Office 3,647,863
Patented Mar. 7, 1972

3,647,863
AMINOALKOXY-TRIPHENYL ETHYLENES AND THE SALTS THEREOF
Frank P. Palopoli, Glenside, Pa., and Thomas R. Blohm and Takashi Kariya, Cincinnati, Ohio, assignors to Richardson-Merrell Inc., New York, N.Y.
No Drawing. Filed Nov. 25, 1968, Ser. No. 778,782
Int. Cl. C07c *93/08*
U.S. Cl. 260—501.18          5 Claims

ABSTRACT OF THE DISCLOSURE

Novel compounds of the formula:

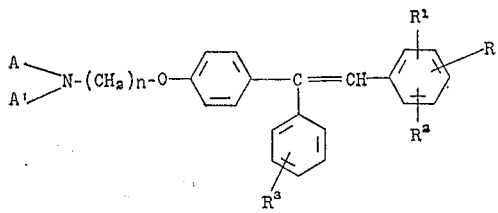

wherein:
(A) each of A and A' is hydrogen or (lower) alkyl or A and A' taken together with the nitrogen to which they are attached is piperidino, morpholino, pyrrolidino or 4-methylpiperazino;
(B) ($n$) is an integer of 2 to 4;
(C) each of $R^1$, $R^2$ and $R^3$ is hydrogen or methyl; and
(D) R is in the para- or a meta-position of the ring and is cycloalkyl of 5 to 8 ring carbon atoms or alkyl of 4 to 8 carbon atoms; or a pharmaceutically acceptable acid addition salt thereof.

---

The compounds of this invention lower blood lipid levels. Thus, they lower the concentration of cholesterol and triglycerides in blood plasma.

This invention relates to novel chemical compounds, their method of preparation and use. More particularly, this invention relates to aminoalkoxy derivatives of triphenyl ethylene possessing an alkyl of 4 to 8 carbon atoms or cycloalkyl of 5 to 8 ring carbon atoms on one of the phenyl rings

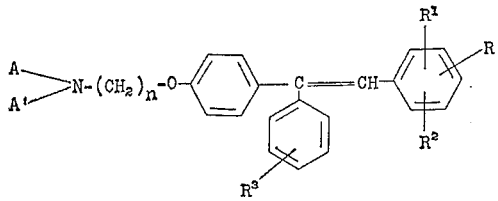

wherein each of A and A' is hydrogen or (lower) alkyl or A and A' taken together with the nitrogen to which they are attached is piperidino, morpholino, pyrrolidino or 4-methylpiperazino; $n$ is an integer of 2 to 4; each of $R^1$, $R^2$ and $R^3$ is hydrogen or methyl; and R is in the para- or a meta-position and is cycloalkyl of 5 to 8 ring carbon atoms or alkyl of 4 to 8 carbon atoms. The compounds of this invention include pharmaceutically acceptable acid addition salts of the base form of such compounds. It has been found that administration of the compounds to warm-blooded animals lowers blood lipid levels. Thus, they lower the concentration of serum cholesterol and triglycerides in blood plasma.

The term "(lower)" as used herein relation to alkyl refers to alkyl having from 1 to 4 carbon atoms, e.g., methyl, ethyl, propyl and butyl. It can be seen from the generic formula for the compounds of this invention in the abstract of the disclosure that the aminoalkoxy group, also referred to as the basic ether group as represented by

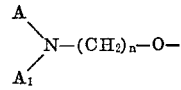

can be a primary amine, a secondary (lower) alkyl amine, a tertiary di(lower)alkylamine, or A and A' together with the nitrogen to which they are attached is a heterocyclic group generally equivalent to di(lower) alkylamino groups in the pharmaceutical art, for example, piperidino, morpholino, pyrrolidino or 4-methylpiperazino. The chain length of the alkylene group between the nitrogen and oxygen as defined by $n$ can be one having 2 to 4 carbon atoms, for example, 1,2-ethylene, 1,3-propylene or 1,4-butylene. Each of the $R^1$, $R^2$ and $R^3$ substituents on the phenyl rings can be hydrogen or methyl which can be in the ortho-, para- or meta-positions on the various rings and which can be the same or different. Thus, $R^1$ and $R^2$ can be hydrogen, whereas $R^3$ is methyl. The alkyl or cycloalkyl defined by R can be a cycloalkyl having 5 to 8 ring carbon atoms or an alkyl having 4 to 8 carbon atoms. Illustrative of the cycloalkyl there can be mentioned cyclopentyl, cyclohexyl, cycloheptyl and cyclooctyl. When R is an alkyl from 4 to 8 carbon atoms it can be either straight chain or branched chain alkyl. Illustrative of straight chain alkyl there can be mentioned butyl, pentyl, hexyl and the like. Preferably, R is in the para-position of the phenyl ring and is branch chained alkyl having a quarternary carbon atom, as can be represented by the group

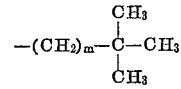

wherein $m$ is 0 or 1, wherein it can be seen that when $m$ is 0 the tertiary butyl group is attached directly to the phenyl ring. When $m$ is 1, the group is 2-neopentyl. Preferably, $m$ is 0 and each of $R^1$, $R^2$ and $R^3$ is hydrogen.

Since the compounds of this invention have an asymmetrically substituted ethylene group, the compounds have geometric isomers of either the cis- or trans-configuration or the compound can be a mixture of the cis- and trans-isomers. The proof developed to date does not clearly establish, however, which of the two isomers is trans and which is cis. However, the isomers are referred to herein as either isomer A or isomer B. These isomers, which, individually, relate to either the cis- or trans-geometric isomers, have been isolated in substantially pure form, i.e., one of the isomers makes up at least 99% and even 99.5% of the compound.

As mentioned hereinbefore, the compounds can be obtained and used in either the base form or the acid addition salt from thereof. Illustrative of pharmaceutically acceptable acid addition salts there can be mentioned those of inorganic acids, for example, hydrochloric, hydrobromic, phosphoric or sulfuric acid, or organic acids such as citric, tartaric, lactic, malonic, maleic or fumaric acid. Preferably, the compounds are used as the acid addition salts.

The compounds of this invention can be prepared by dehydration of ethanol intermediates of structure

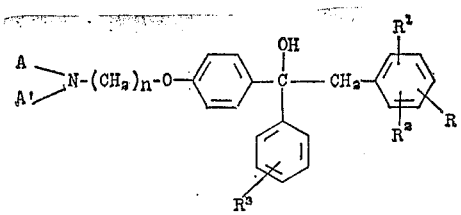

wherein A, A', n, R, R¹, R² and R³ are as defined hereinbefore. Thus, each of A and A' is hydrogen or (lower) alkyl or A and A' taken together with the nitrogen to which they are attached is piperidino, morpholino, pyrralidino or 4-methylpiperazino; n is an integer of 2 to 4; each of R¹, R² and R³ is hydrogen or methyl; and R is cycloalkyl of 5 to 8 ring carbon atoms, or alkyl of 4 to 8 carbon atoms. A number of dehydrating agents may be employed such as, for example, $PCl_5$, $POCl_3$, $SOCl_2$, acetic anhydride or mineral acids, under a variety of reaction conditions. A particularly convenient method employs 2 to 6 normal hydrochloric acid in an aqueous-alcoholic solvent such as, for instance, 30 to 70% aqueous isopropanol. The reaction temperature may vary between room temperature and the boiling point of the solvent and the reaction time from 30 minutes to 24 hours, the longer reaction time being required at lower temperatures and lower acid normality.

The isomers of the compounds of this invention can be separated by fractional recrystallization or by chromatography. In separating the isomers by fractional recrystallization, use can be made of differential solubility of different salts. For example, one isomer may crystallize preferentially as the hydrochloride salt, while the other crystallizes preferentially as acid fumarate salt, as described in Example 2. Column chromatography or preparative gas-liquid chromatography may also be used to separate the isomers.

The above ethanol intermediates can be prepared by the Grignard reaction of a substituted benzylmagnesium bromide or chloride with a benzophenone substituted by the

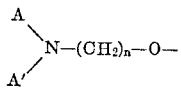

group. Such reactions are described in U.S. Pat. 2,914,562. The substituted benzyl halides of structure

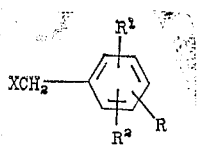

where R, R¹ and R² are as defined hereinbefore and X is a halogen, e.g., chlorine or bromine, may be prepared by a number of procedures known to the art. One method employs the chloromethylation reaction by which a $ClCH_2$— radical is introduced into a benzenoid hydrocarbon by reaction with formaldehyde and hydrochloric acid in the presence of a catalyst such as aluminum chloride, or by reaction of chloromethyl methyl ether in the presence of stannic chloride as catalyst (as described in the following Examples 5–8). Another method employs conversion of a substituted benzyl alcohol to the halide by use of such halogenating agents as thionyl chloride, phosphorus halides or hydrogen halides.

The compounds of this invention lower blood plasma cholesterol in warm-blooded animals, for example rats and monkeys. They also lower plasma triglycerides in such animals. Administration of the compounds lowers the plasma cholesterol without, or with only minimal concurrent accumulation of desmosterol or other sterol precursors of cholesterol. Further, they do not inhibit overall cholesterol biosynthesis at doses which lower plasma cholesterol in the intact animal. Additionally, it has been shown that a compound of this invention lowers the plasma cholesterol of hypercholesterolemic chickens, and protects their coronary arteries against atheroma formation induced by feeding cholesterol, but does not interfere with the protection of the coronary arteries afforded by estrogen. Further, the compounds of this invention do not cause an increase of liver size or weight in animals. Also, they do not produce an estrogenic effect, as exemplified by vaginal cornification in the castrate mouse.

The above described novel combination of biological properties indicates that the compounds of this invention can find safe and effective use in lowering elevated or normal blood cholesterol and triglyceride levels, and in treatment of diseases characterized by elevated blood cholesterol and/or triglyceride levels, such as atherosclerosis.

The compounds of this invention can be administered to warm-blooded animals, e.g., mammals, for the various pharmaceutical effects described hereinabove by conventional techniques. These compounds are highly potent for lowering cholesterol and this potency is evident when they are administered orally. However, these compounds can also be administered parenterally, e.g., subcutaneously. Preferably, they are used together with a pharmaceutical carrier and incorporated by known means into formulations such as tablets, capsules, suspensions, solutions or emulsions. Illustratively, for tablets, the diluent or carrier can be magnesium carbonate or lactose which can be used together with conventional disintegrating agents such as maize starch and alginic acid and lubricating agents such as magnesium stearate. The compounds of this invention can be administered as a mixture of the A and B isomers or administration can be of only one or the other of the two geometric isomers.

The dosage of these compounds can vary from about 2 to 60 mg. per kg. per day of animal body weight, and preferably from about 2 to 20 mg. per kg. per day of animal body weight. In this regard, the lower dosages are more applicable to the larger animals. Suitably, each unit dosage can contain a wide variation in the quantity of the active agent. Such quantity can vary from about 5 to 1000 mg. and preferably from about 100 to 1000 mg. of a compound of this invention together with a significant quantity of a pharmaceutical carrier.

The following examples are illustrative of the invention.

EXAMPLE 1

2-{p-[2-(-tert-butylphenyl)-1-phenylvinyl]phenoxy} triethylamine

To the Grignard reagent prepared from 250 grams (g.) of p-tert-butylbenzyl chloride and 42.5 g. of magnesium turnings in 1.7 liters (l.) of anhydrous ether was added rapidly a solution of 196.5 g. of p-(2-diethylaminoethoxy)benzophenone in 500 milliliters (ml.) of ether. The mixture was refluxed gently for 16 hours in an anhydrous atmosphere and was then decomposed by slow addition of 2 l. of 2 normal (N) ammonium chloride solution. The ethereal phase was separated, washed with water, dried over magnesium sulfate and freed of solvent and gave 433.2 g. of an oil. It was dissolved in 3 l. of hot butanone and 142 g. of citric acid was added. On cooling, 342 g. (81% yield) of 1-[p-(2-diethylaminoethoxy)phenyl] - 1 - phenyl - 2 - (p - tert. - butylphenyl) ethanol dihydrogen citrate was obtained, melting point (M.P.) 1906–110° C. A recrystallized sample had M.P. 110–112° C.

*Analysis.*—Calc'd for $C_{30}H_{39}NO_2 \cdot C_6H_8O_7$ (percent): C, 67.82; H, 71.43; N, 2.20. Found (percent): C, 67.74; H, 7.19; N, 2.21.

A solution of 300 g. of the above compound in 1 l. of 96% ethanol and 0.5 l. of concentrated hydrochloric acid was refluxed for 4 hours. Then, 1.5 l. of water was added, the ethanol was removed by distillation and the mixture was made alkaline by addition of 700 ml. of 40% sodium hydroxide solution. The product was extracted into ether, the extract was washed with water and dried over sodium sulfate and the ether was removed by evaporation. The title compound was obtained in quantitative yield (201 g.) in the form of an oil. It consisted of a mixture of cis and trans isomers, separation of which is described in the following example.

EXAMPLE 2

Separation, characterization and interconversion of cis, transisomers

The mixture of isomers (201 g.) obtained as described in the above Example 1 was dissolved in 700 ml. of hot benzene and 23.5 ml. of 2 N isopropanolic HCl was added. On slow cooling, 89 g. of crystalline material separated that was recrystallized four times from isopropanol and gave 68 g. (69% yield) of one isomer, M.P. 191–192°.

Analysis.—Calc'd for $C_{30}H_{37}NO \cdot HCl$ (percent): C, 77.64; H, 8.25; Cl, 7.64. Found (percent): C, 77.48; H, 8.24; Cl, 7.51.

Gas-liquid chromatography showed this isomer to contain less than 0.5% of the other. For convenience, this isomer is referred to as A isomer hereinbelow.

To obtain the other isomer, the original mother liquor was heated with 10% sodium carbonate solution, the benzene phase was washed with water, dried and evaporated to dryness. The resulting oil was dissolved in 500 ml. of hot isopropanol and 10 ml. of water and 32.5 g. of fumaric acid was added. On slow cooling, 86 g. of crystalline material separated that was recrystallized five times from isopropanol and gave 59 g. (42% yield) of the other isomer, M.P. 172–173° C.

Analysis.—Calc'd for $C_{30}H_{37}NO \cdot C_4H_4O_4$ (percent): C, 75.11; H, 7.60; N, 2.58. Found (percent): C, 75.37; H, 7.61; N, 2.58.

Gas-liquid chromatography showed this isomer to contain less than 0.5% of the other. For convenience, this isomer is referred to as B isomer hereinbelow.

Gas-liquid chromatography using a U-shaped column of 4 feet length and 3 mm. internal diameter packed with 1% "Versamid 900" a commercial polyamide resin on "Chromosorb WaW, DMSC, 60–80 mesh" (a specially treated diatomaceous earth material) at 220° C. separated the two isomers when injected as free bases in chloroform solution. On this system, the A isomers showed a longer retention time than the B isomer. For convenience, this criterion was used to designate all isomers herein described, since their true configuration (cis and trans) is not known.

From the above samples of the two isomers, the following salt pairs were prepared and their melting points determined. In each case, admixture of the two isomers resulted in a distinct melting point depression.

| Salt | Melting point, ° C. | |
|---|---|---|
| | A isomer | B isomer |
| Hydrochloride | 191–192 | 162–164 |
| Acid fumarate | 138–139 | 172–173 |
| Dihydrogen citrate | 142–144 | 134–136 |

Either of the two isomers can be reconverted to the equilibrium mixture of the two isomers by treatment for 4 hours with refluxing 4 N hydrochloric acid in 65% aqueous isopropanol. Gas-liquid chromatography showed the equilibrium mixture to contain 53–55% of A isomer and 45–47% of B isomer.

EXAMPLE 3

Cis- and trans-2-{p-[2-(4-tert-butyl-2,6-xylyl)-1-phenyl-vinyl]phenoxy}triethylamine hydrochloride By the procedure described in Example 1, p-(2-diethylaminoethoxy)benzophenone and the Grignard reagent of 4-tert-butyl-2,6-dimethylbenzyl chloride gave 2(4'-tert-butyl - 2',6' - xylyl) - 1 - [p - (2 - diethylaminoethoxy)phenyl]-1-phenylethanol in 57% yield after two recrystallizations from ether/hexane, M.P. 81–83°.

Analysis.—Calc'd for $C_{32}H_{43}NO_2$ (percent): C, 81.14; H, 9.15; N, 2.96. Found (percent): C, 81.41; H, 9.19; N, 2.91.

This product was dehydrated as described in Example 1 and the isomers of the title compound were separated by fractional recrystallization of the hydrochloride salts: A isomer M.P. 165–173°.

Analysis.—Calc'd for $C_{32}H_{41}NO \cdot HCl$ (percent): C, 78.09; H, 8.60; N, 2.85. Found (percent): C, 78.19; H, 8.57; N, 2.78.

B isomer, M.P. 211.212°; analysis found: C, 78.08; H, 8.53; N, 2.77. Gas-liquid chromatography showed the B isomer to contain less than 1% of A, while the A isomer contained about 14.5% of B.

EXAMPLE 4

Cis or trans-2-{p-[2-(p-tert-butylphenyl)-1-(p-tolyl)vinyl]phenoxy}triethylamine hydrochloride By the procedure described in Example 1, 4-(2-diethylaminoethoxy)-4'-methylbenzophenone and the Grignard reagent of p-tert-butylbenzyl bromide gave 1-[p-(2-diethylaminoethoxy)phenyl] - 1 - (p - tolyl) - 2 - (p - tert-butylphenyl)ethanol dihydrogen citrate, M.P. 108–110° C.

Analysis.—Calc'd for $C_{31}H_{41}NO_2 \cdot C_6H_8O_7$ (percent): C, 68.18; H, 7.58; N, 2.15. Found (percent): C, 67.92; H, 7.52; N, 2.21.

This compound was dehydrated by the procedure described in Example 1 and converted to the hydrochloride salt. After two recrystallizations from butanone-ether, one isomer was obtained, M.P. 182–184° C.

Analysis.—Calcd. for $C_{31}H_{39}NO \cdot HCl$ (percent): C, 77.88; H, 8.43; N, 2.93. Found (percent): C, 77.85; H, 813; N, 2.92. Gas-liquid chromatography showed this compound to contain about 2% of the other isomer. By the criteria described in Example 2, it is designated as A isomer.

EXAMPLE 5

Cis or trans-2-{p-[2-(p-cyclohexylphenyl)-1-phenyl-vinyl]phenoxy}triethylamine hydrochloride A mixture of 228 g. of phenylcyclohexane, 200 g. of chloromethyl methyl ether and 600 ml. of carbon disulfide was cooled to 0° C. and, with vigorous stirring, 120 g. of anhydrous stannic chloride was added over 60 minutes while maintaining the reaction temperature at 0–5° C. After one hour of stirring at that temperature, the mixture was poured on 800 g. of ice and the organic phase was separated, washed with water and dried over calcium chloride. The oil resulting after evaporation of solvent was distilled at 27 mm. of pressure and the fraction boiling at 180–184° was collected to give 178.1 g. (57% yield) of p-cyclohexylbenzyl chloride.

The Grignard reagent of this material was prepared and allowed to react with p-(2-diethylaminoethoxy))benzophenone as described in Example 1 and gave the carbinol intermediate that, without purification, was dehydrated by the method described in Example 1 to give the isomeric mixture of the title compound. The hydrochloride salt, after five recrystallizations from butanone-cyclohexane, gave one of the isomers, M.P. 175–176°.

Analysis.—Calc'd for $C_{32}H_{39}NO \cdot HCl$ (percent): C, 78.42; H, 8.23; N, 2.86. Found (percent): C, 78.42; H, 8.26; N, 2.83. Gas-liquid chromatography showed this isomer to contain less than 1% of the other; by criteria described in Example 2 it is designated as B isomer. The other isomer was not isolated in pure form.

EXAMPLE 6

2-{p-[2-(p-n-butylphenyl)-1-phenylvinyl]phenoxy}triethylamine

By the procedure described in Example 5, p-n-butylbenzyl chloride was prepared, B.P. 140–146° (25 mm.). It was converted to the Grignard reagent and allowed to react with p-(2-diethylaminoethoxy)benzophenone to give 1-[p-(2-diethylaminoethoxy)phenyl] - 2-(p-n-butylphenyl)-1-phenylethanol that, without purification was dehydrated to the title compound by the method described in Example 1.

EXAMPLE 7

2-{p-[2-(3-tert-butyl-6-methylphentyl)-1-phenylvinyl]phenoxy}triethylamine

By the procedure described in Example 5, 3-tert-butyl-6-methylbenzyl chloride was prepared, B.P. 141–144° (25 mm.). It was converted to the Grignard reagent and allowed to react with p-(2-diethylaminoethoxy)benzophenone to give 1-[p-(2-diethylaminoethoxy)phenyl]-2-(3-tert-butyl-6-methylphenyl)-1-phenylethanol that, without purification, was dehydrated to the title compound by the method described in Example 1.

EXAMPLE 8

Cis and trans-2{p-[2-(p-neopentylphenyl)-1-phenylvinyl]phenoxy}triethylamine

The Grignard reagent of benzyl chloride (531 g.) was prepared in 5 l. of anhydrous ether and 462 g. of tert-butyl chloride in 500 ml. of ether was added to it over 3 hours. After stirring the mixture overnight, 750 ml. of a saturated ammonium chloride solution was added, the magnesium salts that formed were removed by filtration and the ether was evaporated. The residue was distilled under reduced pressure to give 357.5 g. (48% yield) of neopentylbenzene, B.P. 81–84° (27 mm.). From it p-neopentylbenzyl chloride was parepared in 53% yield by the method described in Example 5, B.P. 140–144° (26 mm.). It was converted to the Grignard reagent and allowed to react with p-(2-diethylaminoethoxy)benzophenone as described in Example 1 and gave 1-[p-(2-diethylaminoethoxy)phenyl]-2-(p-neopentylphenyl)-1-phenylethanol in 51% yield. M.P. 56–58°.

*Analysis.*—Calc'd for $C_{31}H_{41}NO_2$ (percent): C, 81.00; H, 8.99; N, 3.05. Found (percent): C, 81.20; H, 8.87; N, 3.03.

This carbinol (37.0 g.) was dehydrated by the procedure described in Example 1 to give 28.3 g. of the title compound as an oil. It was dissolved in butanone and 32.5 ml. of 2 N isopropanolic HCl was added to it. The percipitate that resulted was recrystallized twice from butanone to give 11.8 g. of one of the isomers, M.P. 170–171°.

*Analysis.*—Calc'd for $C_{31}H_{39}NO \cdot HCl$ (percent): C, 77.87; H, 8.43; N, 2.92. Found (percent): C, 77.89; H, 8.24; N, 3.06. Gas-liquid chromatography showed this isomer to contain less than 0.5% of the other isomer. By the criteria described in Example 2, it was designated as A isomer.

To obtain the other isomer, the mother liquors were converted to the fumarate salt as described in Example 2 and 6.6 g. of B isomer were obtained, M.P. 162–164°.

*Analysis.*—Calc'd for $C_{31}H_{39}NO \cdot C_4H_4O_4$ (percent): C, 75.37; H, 7.77; N, 2.51. Found (percent): C, 75.09; H, 7.77; N, 2.61. Gas-liquid chromatography showed this isomer to contain about 1% of the other.

EXAMPLE 9

Hypocholesterolemic activity in immature rats

Immature rats of the Sprague-Dawley strain weighing initially about 75 g. were injected subcutaneously with 50 mg./kg. of the test compound suspended in olive oil. Groups of 6 animals were thus treated for a period of 10 days. The control group of 6 animals was injected with olive oil alone. The animals were then sacrificed, blood samples were obtained by cardiac puncture and the plasma was analyzed for cholesterol. The results are listed in Table I.

TABLE I.—REDUCTION OF PLASMA CHOLESTEROL IN RATS AFTER TREATMENT WITH 50 MG./KG. SUBCUTANEOUSLY FOR 10 DAYS $(C_2H_5)N-CH_2CH_2-O-\langle\rangle-C=CH-\langle\rangle-R$ with $R_1$, $R_2$ (on vinyl phenyl), $R_3$ (on phenyl attached to C)

| Compound of Example | R | $R^1$ | $R^2$ | $R^3$ | Isomer[a] | Plasma cholesterol, percent reduction vs control |
|---|---|---|---|---|---|---|
| 2 | —C(CH₃)₃ | H | H | H | A [b] | 45 |
|   |   |   |   |   | B [c] | [d] 33 |
| 3 | —C(CH₃)₃ | CH₃ | CH₃ | H | A [d] | 28 |
|   |   |   |   |   | B [d] | 34 |
| 4 | —C(CH₃)₃ | H | H | CH₃ | A [d] | [d] 26 |
| 5 | (cyclic group) | H | H | H | B [d] | 20 |
| 8 | —CH₂C(CH₃)₃ | H | H | H | A [d] | 27 |

[a] For definition of isomers, see Example 2.
[b] As hydrochloride salt.
[c] As acid fumarate salt.
[d] Administered orally.

To determine whether desmosterol or other sterol precursors of cholesterol biosynthesis were formed, blood samples from each group of animals were pooled, subjected to hydrolysis to convert sterol esters to free sterols which were then extracted with petroleum ether. Aliquots were converted to trimethylsilyl ether derivatives and analyzed by gas-liquid chromatography using cholestane as internal standard. Only one sharp peak corresponding to cholesterol was observed for all the compounds listed in Table I. Amounts of more than 0.5% of desmosterol content of the sterol fraction would have been detected by this method.

EXAMPLE 10

Anti-hypercholesterolemic and coronary protective effect in cholesterol-fed cockerels Leghorn cockerels, about 8 weeks old, were fed a commercial growing mash diet supplemented with 1% cholesterol and 5% cottonseed oil for 6 weeks. Groups of 8 chickens were injected 6 days/week with 37.5 mg./kg. of the hydrochloride salt of 2-{p-[2-(p-t-butylphenyl)-1-phenylvinyl]phenoxy}triethylamine, Example 2, Isomer A, which does not have vaginal cornification or uterotrophic effects, with and without concomitant injection of estradiol benzoate, 1.5 mg./kg. Control groups, consisting of 16 cockerels each, received olive oil injections or injections of 1.5 mg./kg. of estradiol benzoate 6 days/week. All test materials were dissolved or suspended in olive oil, and injections were made subcutaneously. At the end of the treatment period, the chickens were bled by cardiac puncture, sacrificed, and the hearts were removed for histologic evaluation of coronary atherosclerosis. Plasma cholesterol determinations were then made. The extent of coronary atherosclerosis was evaluated on histologic sections of the heart, stained with Sudan IV, and was expressed as the percent of coronary arteries observed in the sections which showed evidence of atheromatous changes.

The results are listed in Table II.

TABLE II.—ANTI-HYPERCHOLESTEROLEMIC AND CORONARY PROTECTIVE EFFECT IN CHOLESTEROL-FED COCKERELS

| Treatment | Plasma cholesterol, mg./100 ml. | | Percent inhibition of hypocholesterolemia | Percent of coronary arteries with lesions |
| --- | --- | --- | --- | --- |
| | Pre-treatment | 6 weeks | | |
| Control | 104 | 907 | | 13.0 |
| Estradiol benzoate | 102 | 1,529 | | 7.0 |
| Example 2, Isomer A | 100 | 371 | 66 | 4.1 |
| Example 2, isomer A plus estradiol benzoate | 104 | 1,606 | 0 | 6.4 |

EXAMPLE 11

Hypocholesterolemic activity in monkeys

Two or three pretreatment samples of blood were obtained, a week apart, from Rhesus and Cebus monkeys. The monkeys were then given orally, 20 mg./kg./day of the test compound for 3 to 6 weeks. Blood was taken at intervals and analyzed for plasma total cholesterol concentration. A colorimetric procedure utilizing the Lieberman-Burchard reagent was employed after alkaline hydrolysis of the sterol esters and extraction of the sterols into petroleum ether.

The change between the average plasma cholesterol concentration during the pretreatment period and treatment period was found to be as follows:

| Compound of Example | Isomer | Number of monkeys | Percent reduction of plasma cholesterol |
| --- | --- | --- | --- |
| 2 | A | 4 | 14 |
| | B | 2 | 27 |

EXAMPLE 12

Effect on plasma triglyceride levels of rats

Immature male rats of the Sprague Dawley strain weighing initially about 78 grams were injected subcutaneously with 25 and 50 mg./kg. of the test compound suspended in olive oil. Control rats received subcutaneous injections of olive oil only. The test groups contained 10 rats and the control group contained 20 rats. After 10 days of treatment, the rats were fasted overnight and bled by cardiac puncture on the 11th day. Plasma triglyceride determinations were performed by an automated fluorometric technique.

The following results were obtained:

| Compound of Example | Isomer [1] | Dose, mg./kg. | Plasma triglyceride, percent reduction vs. control |
| --- | --- | --- | --- |
| 2 | A | 25 | 0 |
| | | 50 | 18 |
| | B | 25 | 20 |
| | | 50 | 34 |

[1] Isomer A administered as the hydrochloride. Isomer B administered as the fumarate.

EXAMPLE 13

An illustrative composition for hard gelatin capsules is as follows:

Per capsule, mg.
(a) 2-{p-[2-(p-tert-butylphenyl) - 1 - phenylvinyl]phenoxy}triethylamine hydrochloride _____ 200
(b) Talc _____ 35

The formulation is prepared by passing the dry powders of (a) and (b) through a fine mesh screen and mixing them well. The powder is then filled into hard gelatin capsules at a net fill of 235 mg. per capsule. The active ingredient can be that of a mixture of isomers A and B or simply one of the isomers substantially free of the other.

EXAMPLE 14

An illustrative composition for tablets is as follows:

Per tablet, mg.
(a) 2-{p-[2-(p-tert-butylphenyl) - 1 - phenylvinyl]phenoxy}triethylamine hydrochloride _____ 100
(b) Wheat starch _____ 15
(c) Lactose _____ 33.5
(d) Magnesium stearate _____ 1.5

Preparation: A granulation obtained upon mixing lactose with the starch and granulated starch paste is dried, screened and mixed with the active ingredient containing at least 50% of the A isomer and magnesium stearate. The mixture is compressed into tablets weighing 150 mg. each.

What is claimed is:
1. A compound of the formula

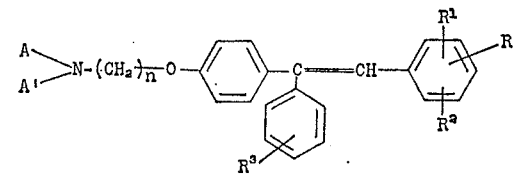

wherein:
(A) each A and A' is (lower)alkyl;
(B) n is an integer of 2 to 4;
(C) each of $R^1$, $R^2$ and $R^3$ is hydrogen; and
(D) R is cyclohexyl in the para- or a meta-position or a pharmaceutically acceptable acid addition salt thereof.

2. A compound of the formula

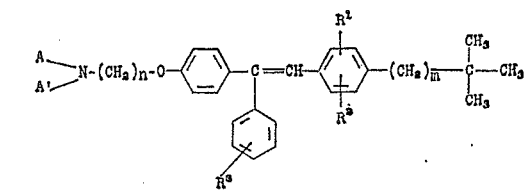

wherein:
(A) each of A and A' is lower alkyl;
(B) n is an integer of 2 to 4;
(C) each of $R^1$, $R^2$ and $R^3$ is hydrogen or methyl and m is an integer of 0 or 1; or a pharmaceutically acceptable acid addition salt thereof.

3. A compound of claim 2 wherein m is 0.
4. A compound of claim 3 wherein each of $R^1$, $R^2$ and $R^3$ is hydrogen.

5. 2-{p-[2-(p-tert-butylphenyl) - 1 - phenylvinyl]-phenoxy}triethylamine or a pharmaceutically acceptable acid addition salt thereof.

References Cited

UNITED STATES PATENTS

| | | | |
|---|---|---|---|
| 2,914,561 | 11/1959 | Allen et al. | 260—570 |
| 2,971,001 | 2/1961 | Palopoli et al. | 260—570 X |
| 3,168,565 | 2/1965 | Palopoli et al. | 260—570.7 |
| 3,272,841 | 9/1966 | De Wald | 260—570 UX |
| 3,288,806 | 11/1966 | De Wald | 260—570 X |

FOREIGN PATENTS

| | | | |
|---|---|---|---|
| 797,473 | 7/1958 | Great Britain | 260—570 |
| 1,064,629 | 4/1967 | Great Britain | 260—570 |

OTHER REFERENCES

Burger, "Medicinal Chemistry," 2nd ed., pages 82–83 (1960).

ROBERT V. HINES, Primary Examiner

U.S. Cl. X.R.

260—240(B), 247.7(C), 268(R), 294.7(M), 326.5(M), 570(R), 651(HA); 424—248, 250, 267, 274, 330

PO-1050
(5/69)

UNITED STATES PATENT OFFICE
CERTIFICATE OF CORRECTION

Patent No. 3,647,863                    Dated   March 7, 1972

Inventor(s)  Frank P. Palopoli et al.

It is certified that error appears in the above-identified patent and that said Letters Patent are hereby corrected as shown below:

Column 1, line 68, "as used herein relation" should read "as used herein in relation".  Column 2, line 55, "addition salt from thereof" should read "addition salt form thereof".  Column 4, line 45, "2-{p[2-(-tert-" should read "2-{p[2-(p-tert-"; column 4, line 63, "(M.P.) 1906-110°C." should read "M.P.) 106-110°C.". Column 6, line 22, "211.212°" should read "211-212°".  Column 7, line 11, "(25 mm)" should read "(26 mm)"; column 7, line 21, "methylphentyl" should read "methylphenyl".  Column 8, the formula

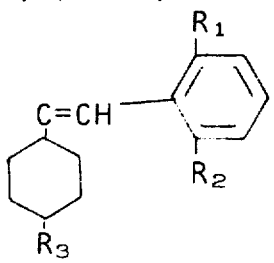        should read        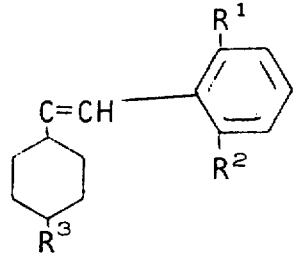

Column 8, line 31, compound of Example 3, A & B reads (administered orally) and should read (as hydrochloride salt); compound of Example 4, A reads (administered orally) and should read (as hydrochloride salt); compound of Example 5, B reads (administered orally) and should read (as hydrochloride salt); compound of Example 8, A reads (administered orally) and should read (as hydrochloride salt).

Signed and sealed this 29th day of April 1975.

(SEAL)
Attest:

RUTH C. MASON
Attesting Officer

C. MARSHALL DANN
Commissioner of Patents
and Trademarks